United States Patent [19]

McGee

[11] Patent Number: 4,639,626
[45] Date of Patent: Jan. 27, 1987

[54] PERMANENT MAGNET VARIABLE RELUCTANCE GENERATOR

[75] Inventor: Daniel W. McGee, Fairfield, Iowa

[73] Assignee: Magnetics Research International Corporation, Fairfield, Iowa

[21] Appl. No.: 727,441

[22] Filed: Apr. 26, 1985

[51] Int. Cl.[4] .......................................... H02K 21/38
[52] U.S. Cl. .................... 310/155; 310/168; 310/268
[58] Field of Search ................ 310/155, 168, 257, 268

[56] References Cited

U.S. PATENT DOCUMENTS

| 2,110,144 | 3/1938 | Durkee | 310/155 |
|---|---|---|---|
| 3,069,577 | 12/1962 | Lee | 310/166 |
| 3,221,196 | 11/1965 | Henry-Baudot | 310/268 |
| 3,230,406 | 1/1966 | Henry-Baudot | 310/155 |
| 3,293,469 | 12/1966 | Crawford et al. | 310/168 |
| 3,321,652 | 5/1967 | Opel | 310/168 |
| 3,470,408 | 9/1969 | Lewis et al. | 310/155 X |
| 3,484,635 | 12/1969 | MacKallor, Jr. | 310/266 |
| 3,509,390 | 4/1970 | Loughlin et al. | 310/168 X |
| 3,549,923 | 12/1970 | Kurakin | 310/162 |
| 3,673,446 | 6/1972 | Watai et al. | 310/172 |
| 3,821,575 | 6/1974 | Colosimo | 310/266 |
| 3,983,430 | 9/1976 | Howard | 310/155 |
| 4,143,289 | 3/1979 | Williams | 310/168 X |

OTHER PUBLICATIONS

Publication: "Direct-Current Generator"-McGraw-Hill, Inc., Copyrighted 1960, 1966, 1971, 1977-McGraw-Hill Encyclopedia of Science & Technology pp. 243-245.
Article: Entitled "Electrodynamics"-Author: Unknown-Date of Publication: Unknown-Publisher: Unknown-pp. 60-61.
Article: Entitled "Electro Generator (Dynamo)"-Author: Unknown-Date of Publication: Unknown-Publisher: Unknown pp. 64-65.
Article: Entitled "Alternators"-Author: Unknown--Date of Publication: Unknown-Publisher: Unknown-pp. 554-3914; 555-3915; 556-3916; 557-3917.
Article: Entitled "Coreless Induction Furnaces"-M. J. Marchbanks-Final Form: 1-28-46-pp. 517-531.
Article: Entitled "The Theory of the Indicator Alternator:-J. W. Walker-Nov. 9, 1941-pp. 227-241.
Article: Entitled "End-Winding Leakage of High-Speed Alternators by Three-Dimensional Field Determination"-Mulukutla Sreeram Sarma-1968-pp. 9-14.
Article: Entitled "Electromagnetic & Electromechanical-L. W. Matsch, 1977 2nd Edition-pp. 485-491.

Primary Examiner—Donovan F. Duggan
Attorney, Agent, or Firm—Bell, Seltzer, Park & Gibson

[57] ABSTRACT

A variable magnetic reluctance generator is disclosed generally comprising a stator having pairs of spaced magnetic poles of opposite polarity. Like polarity poles are adjacent one another to define a gap having all poles of the same polarity on the same side, and permanent magnet means provide an essentially uniform magnetic field intensity along the length of the gap. The opposite polarity poles are connected by a magnetically permeable path that is surrounded by a stator winding. The rotor has alternating segments of high and low magnetic permeability and these segments move through the gap between the opposite polarity poles, which changes the magnetic permeability between them. This causes variations in the magnetic flux in the magnetically permeable path, which induces an electrical current in the surrounding stator winding. Output voltage may be controlled by auxiliary field coils on the stator or by other means.

27 Claims, 10 Drawing Figures

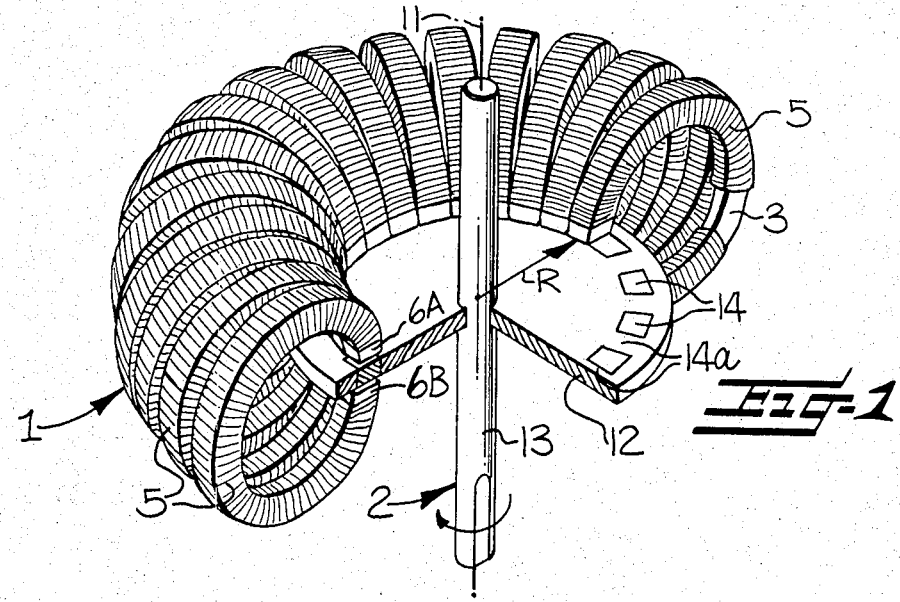
Fig-1
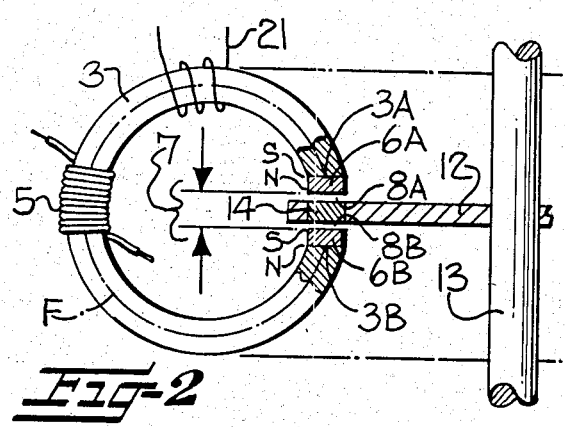
Fig-2
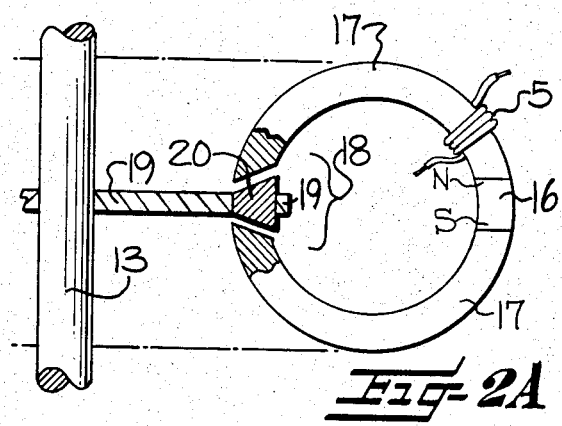
Fig-2A
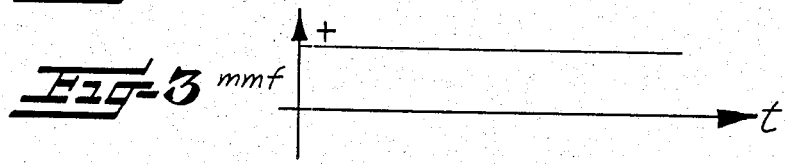
Fig-3 mmf
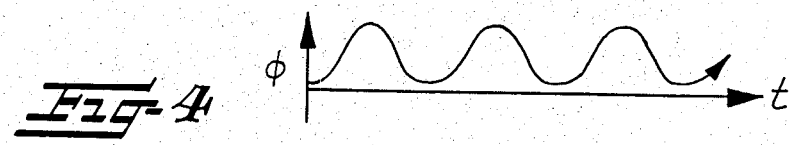
Fig-4 φ
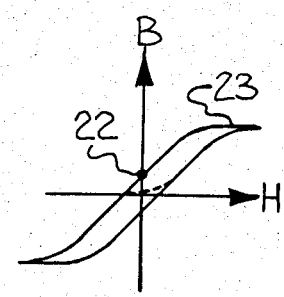
Fig-6
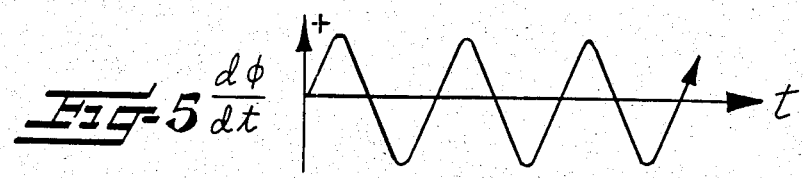
Fig-5 $\frac{d\phi}{dt}$

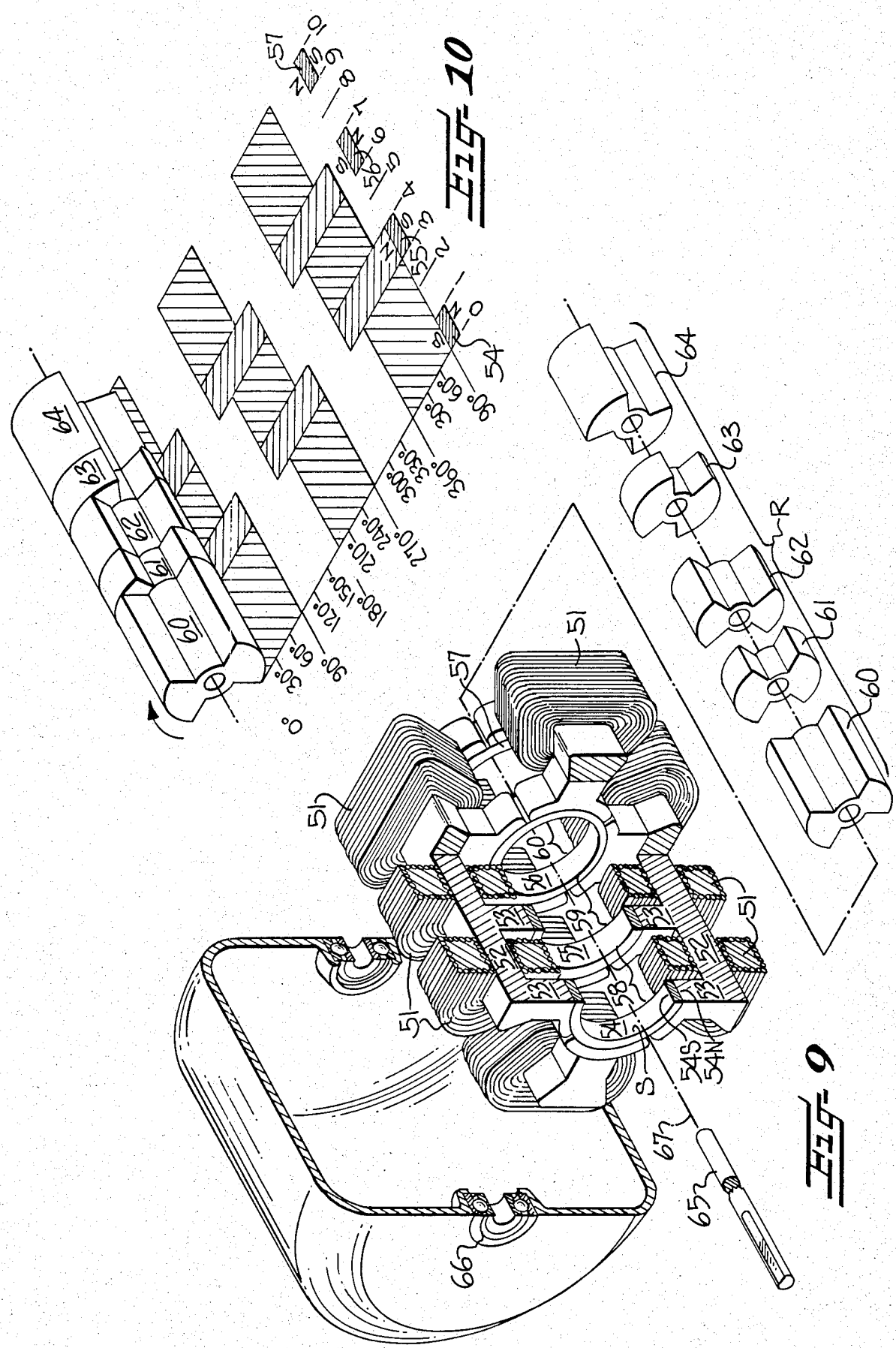

PERMANENT MAGNET VARIABLE RELUCTANCE GENERATOR

This invention relates to the generation of electrical energy by changing the magnitude of magnetic flux in a generator without changing its direction through the use of unique and complementary stator and rotor configurations. By varying the reluctance or permeability of the magnetic circuit, the magnetic flux therein changes with respect to time, thereby generating an electrical current in an associated electrical conductor.

The generator of the present invention is based upon the same laws of electromagnetism utilized in conventional generators, but it is different in its configuration and mode of operation. Most prior generators are characterized by relative motion between a coil of wire and a magnetic field such that the wire cuts through the lines of force of the magnetic field to generate electricity in the coil. This requires electrical windings on a rotor, the use of slip rings or brushes to accommodate the rotation of the windings, and the maintenance of a rotating electrical connection. Some of the problems associated with such a design include the continuous attention required by slip rings or brushes, and the serious operational hazards arising from the continuous arcing and sparking as the rotor contacts move past the stationary brush. Slip rings and brushes also degrade operational efficiency through electric power loss from the electrical resistance of the brush contact, and through mechanical friction loss from the drag of the brushes on the rotor. The presence of windings on the rotor also significantly increases the weight or mass of the rotor, necessitating slower rotational speeds and more energy from the prime mover. Still further, the constant rotation and heating of the coils causes them to fatigue and fail with time.

Some prior generators function without slip rings and brushes, but have other inherent limitations not found in the more common generator designs. For example, the inductor alternator varies magnetic path induction by means of a wireless toothed rotor. The field is maintained by electromagnets on the stator, and the armature coils are also mounted on the stator. The inductor alternator has not found widespread acceptance since it is more bulky and less efficient than more traditional generator types.

More recent solutions to the slip ring/brush problem have been found by mounting permanent magnets, rather than electromagnets, on the rotor. This eliminates the need for rotating electrical connections, saves the electrical power otherwise expended in exciting the field, lessens the amount of internal heat generation, and increases power density. However, such permanent magnet generators are severely limited in application since they have no viable means for controlling voltage output with changes in load. They are further severely limited in rotor speed and size because the magnets do not have great structural strength and cannot withstand high inertial forces. In addition, assembly of large machines entails binding together many small magnets whose fields are in opposition, followed by installation of a large magnetized rotor in an iron based alloy stator. The huge magnetic forces involved in these assembly operations make large scale production and maintenance of such machines very difficult, time consuming, and costly.

Further aspects of prior generators which detract from performance include full reversal of the magnetic field, resulting in hysteresis loss, eddy current loss, and heat production; and non-uniformity of torque, producing higher harmonics which reduce output quality and efficiency. At constant demand, non-uniform torque results from the discreteness of the field poles and the magnetomotive force they produce.

The present invention incorporates virtually all of the positive characteristics of all previous generator types including but not limited to those discussed herein. Further, it eliminates or mitigates many of the problems associated with such generator designs.

The present invention utilizes stationary permanent magnets, stationary armature windings, stationary auxiliary field control windings, and a rotor with no windings. Motion of the rotor varies the reluctance of the magnetic circuit and produces an alteration in the magnetic flux passing through the armature.

The physical qualities of the generator include no slip rings or brushes and fewer moving parts, which make it more reliable, easier to service, quieter, and eliminates arcing or sparking. Similarly, since it is smaller and lighter, it is adaptable for applications with limited space, and has an enhanced portability. Its operational characteristics include the use of a smaller prime mover to obtain the same power output, higher efficiency, lower operating costs, higher realiability, lower initial cost, and quieter operation. The unique design permits ready access to the electrical conductors making them easier to cool and service. The conductors are also stationary, making them compatible with gas or liquid cooling.

Since the magnetic field is supplied by one or more permanent magnets, the machine has virtually all of the advantages of permanent magnet rotor generators, including higher efficiency (due in large part to the elimination of the primary field current), brushless rotor, improved power density, and decreased heat production. Because of the unique design, however, it does not have the drawbacks of typical permanent magnet machines. Higher speeds and larger rotors are possible and ruggedness and reliability are improved because the magnets are not mounted on the rotor. Hysteresis and eddy current loss will be less since the flux variation can be approximately half as great. Production and maintenance are more practical since small magnets can be used separately. In addition, more efficient use is made of the magnet material by greater flux "squeezing" and by multiple path uses of the same magnet.

Generators relying upon permanent magnets for excitation and operation may suffer from a drop in voltage as current is drawn out. This problem arises from the inability to control the magnetic field to compensate for the voltage drop. However, the present invention discloses the use of permanent magnets and voltage control, which also assists in suppressing voltage surges or spikes.

The present invention will also have all of the advantages of the traditional inductor generator, but will be significantly more efficient and less bulky.

Utilization of the essentially continuous nature of the field pole strength next to the air gap, along with incorporation of the properly shaped and spaced permeable portions on the rotor, can result in more uniform torque and a voltage output virtually free of higher harmonic distortion.

Further, armature reaction does not result in localized distortions of the air gap field. Rather, it occurs as a global effect on the entire cross section of the magnetic flux path, and as a result, is easier to analyze, detect, and correct.

In addition, the device may be operated as a single phase or poly-phase system making it more versatile for sophisticated application, including co-generation.

SUMMARY OF THE INVENTION

The invention disclosed is a variable magnetic reluctance generator generally comprising a stator having a plurality of pairs of spaced magnetic poles of opposite polarity. Like polarity poles are adjacent one another to define a gap having all poles of the same polarity on the same side, and permanent magnet means provide an essentially uniform magnetic field intensity along the length of the gap. The opposite polarity poles are connected by a magnetically permeable path that is surrounded by a stator winding. The rotor has alternating segments of high and low magnetic permeability and these segments move through the gap between the opposite polarity poles, which changes the magnetic permeability between them. This causes variations in the magnetic flux in the magnetically permeable path, which induces an electrical current in the surrounding stator winding. Output voltage may be controlled by auxiliary field coils on the stator which add to, or substract from, the permanent magnet produced flux as the load changes and/or by switches on the armature coils which, depending on demand, connect more or fewer coil turns in series with the output terminals. Different embodiments are disclosed herein.

BRIEF DESCRIPTION OF THE DRAWINGS

FIG. 1 is a perspective view of the generator of the present invention with half of the stator removed for clarity and a portion of the rotor shown in cross section.

FIG. 2 is side view of a generator of the type shown in FIG. 1.

FIG. 2A is a side view of a generator of the type shown in FIG. 1 with a typical alternate design for the rotor and portions of the stator.

FIG. 3 is a graph of the direction of magnetomotive force in a magnetically permeable path of the present invention.

FIG. 4 is a graph of a possible variation in the magnitude of the flux with respect to time in a magnetically permeable path of the present invention.

FIG. 5 is a graph of a possible variation in the magnitude of the generated voltage with respect to time in an armature coil of the present invention.

FIG. 6 represents a hysteresis loop of the type typically encountered in highly permeable materials. The fully reversed loop is designated by a solid line; the non-fully reversed loop by a dashed line.

FIG. 9 is a perspective view of another alternate embodiment of the present invention with a portion of the stator removed for clarity and the rotor shown in an exploded view.

FIG. 10 is a graph representing possible positions of the rotor segments as a function of rotation of the rotor and linear position along the rotor axis for the alternate embodiment of FIG. 9.

DESCRIPTION OF AN ILLUSTRATIVE EMBODIMENT

Figure 7:
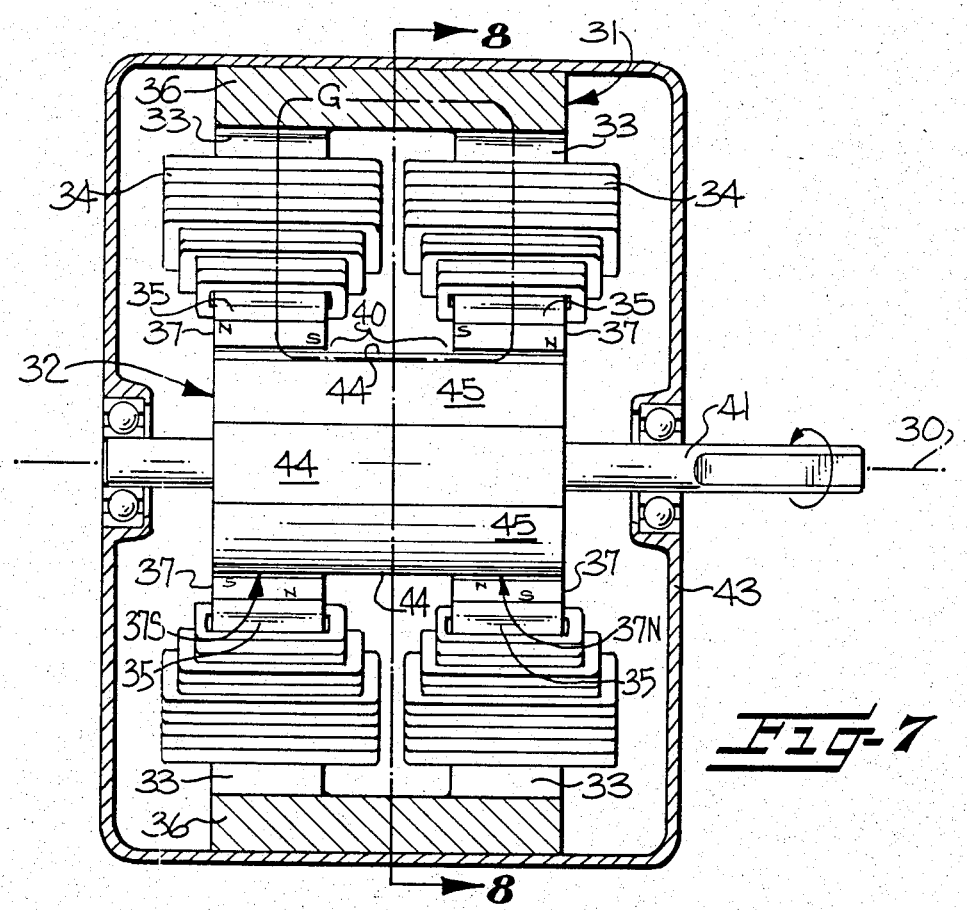
FIG. 7 is a cross sectional view of an alternate embodiment of the generator of the present invention taken along the line 7—7 of FIG. 8.

Referring to FIGS. 1 and 2, the variable reluctance generator of the present invention generally includes a stator portion 1 and a rotor portion 2. Each of these portions is discussed in detail.

Referring to the stator, it includes a plurality of stator cores 3 arranged together to generally form a toroid. Each stator core is made of highly permeable magnetic material and is generally "C" shaped, though it may be any shape, to define an opening between opposing core ends 3A, 3B. The cross sectional configuration of each stator core is shown retangular but may be varied. Each of the stator core ends has a high strength permanent magnet 6A, 6B, such as, but not limited to, one made of rare earth cobalt or neodymium ferrite, attached thereto and in magnetic circuit therewith. The magnets are oriented to define an air gap 7 between their respective opposing pole faces 8A, 8B, with opposite polarity poles facing each other across the gap thereby defining a flux path F through the stator core. The shape, size, number, material, and properties of the magnets as well as their position on the stator core may vary depending on waveform and magnitude of electrical output desired as well as on other design considerations.

The pole faces 8A, 8B of the opposing polarity spaced magnets 6A, 6B are aligned with all pole faces being on the circumference of a circle and being coplanar to define a gap 7 having a constant radial distance R from the stator axis 11. Like polarity poles are adjacent one another on the same side of the air gap 7, forming a substantially continuous pole surface around all 360° of the gap length. The surface area of each of the individual pole faces 8A, 8B making up the continuous pole surface is substantially the same.

A stator winding 5 of electrically conductive wire preferably surrounds each stator core. The ends of the various windings are electrically connected in a predetermined manner, i.e. series, parallel, delta, etc. to provide an electrical output having the desired phases, currents, voltages, and waveforms. The number of turns per winding and the nature of the interconnections from winding to winding, if any, may be changed to accommodate the desired electrical output characteristics. Space limitations do not severely limit the number of turns that can be wound around the cores. This can increase voltage considerably.

The peripheral location of the coils on the stator cores makes cooling easier, and this may be enhanced by using the rotating shaft or rotor to convect cooling air across the coils. Likewise, serviceability is improved through easier access to the coils.

The rotor portion 2 of the generator comprises a disk 12 mounted for rotation on a shaft 13 that is perpendicular to the disk surface and colinear with the axis 11 of the stator portion 1. The axis of the stator portion coincides with the center of the circle formed by the pole faces 8 of the stator magnets. The disk is made of a material having a low magnetic permeability, such as but not limited to aluminum. Inserts of a material having a high magnetic permeability 14 are disposed in the rotor at a radial distance equal to the radial distance R from the axis of the stator to the air gap 7 as defined by the pairs of spaced magnetic pole faces of opposite polarity. As shown, the inserts extend through the entire width of the disk 12, as measured axially, though they may extend more or less than the width of the disk. The shape of each of the highly permeable segments 14 and each of the spaces 14A of low magnetic permeability between adjacent highly permeable segments both preferably correspond to the surface area and shape of each of the adjacent pole surfaces that together define the air gap but they may also be of different shape and spacing. The surface portion of each of the high and low permeability magnetic segments of the rotor may or may not be substantially parallel to the pole faces of each of the poles. These surface portions do not have to be planar, nor do the corresponding surface portions of the stator.

The rotor shaft is journaled by known means and connected to a prime mover (not shown) such as a steam turbine, diesel engine, etc., to rotate the rotor disk. As it is rotated, the alternating segments of high and low magnetic permeability 14, 14A move through the length of the air gap 7 between the opposite polarity poles of each pair of opposing magnets 6A, 6B. As the magnetic permeability in the gap changes, the permeance of the flux path F will cyclically alternate between high and low values. Thus, the magnetic flux in each of the individual stator cores 3 will also cyclically alternate between high values when the highly permeable magnetic material is present in the associated gap to low values when the low permeability magnetic material is present in the associated gap. This variation in flux in the stator core generates a voltage in the associated surrounding stator winding 5.

Voltage can be controlled by varying a DC current in coil 21 which may be located anywhere along the magnetic flux path. The primary flux from the permanent magnet is then enhanced or reduced sufficiently to raise or lower output voltage amplitude. Alternately, voltage may be controlled by a group of switches (not shown) connecting a variable number of armature turns 5 directly to the output terminals. The DC voltage or opening and closing of the switches may be controlled using conventional voltage regulation monitors, control techniques, and circuitry.

The rotor may be lightweight, requiring less energy and time during transients to bring it up to operating speed. Frictional and air drag loss are reduced, and higher speeds, and hence higher voltages, are more easily obtained. In addition, proper design of the permeable rotor sections 14 and 14A can produce essentially any desired waveform, virtually free of high harmonic distortion. This improves efficiency and output energy quality. Further, since the torque requirements may be more constant, voltage and frequency variations should be lessened, further contributing to a higher quality output energy.

Unlike conventional generators, the field and the armature are both part of the stator assembly. No current is needed to excite the fields, and no energy is lost from arcing over slip rings or brushes. Distortion and weakening of the primary field by armature reaction is reduced because the coils are not in close proximity to the source of the magnetomotive force. This also results in more uniform torque requirements to drive the rotor, and in a higher quality output.

Referring to of FIG. 2A, an alternate embodiment is disclosed that substitutes a single magnet 16 for the two magnets 6A, 6B of FIG. 1 with the magnet remote from the pole face. Magnetically permeable material 17 is connected to and in magnetic circuit with each of the pole faces thereof. The magnetically permeable material defines a gap 18 having typically planar surfaces that are angled with respect to each other. The rotor 19 is as described earlier with alternating segments of high and low magnetic permeability. The high permeability segments 20 may be shaped to correspond to the orientation and surface area of the planar surfaces of the gap 18.

The magnet 16 may be located anywhere along the magnetic path including a position next to the air gap 18. The surface of the magnetic material 17 on either side of the air gap need not be planar. Neither do the high permeability segments 20 need be planar. Further, the surfaces of segments 20 do not have to parallel the air gap surfaces of 17. In addition, any number of magnets may be used in any given flux path F. The remote location of the magnet enhances reliability and minimizes damage to the magnet.

Referring to FIGS. 3-6, the direction of the magnetomotive force through the stator core as generated by the magnets 6A, 6B is constant, as shown in FIG. 3. As the rotor turns and the alternating segments of high and low magnetic permeability vary the reluctance of the flux path F in each stator core, the magnitude of the flux with respect to time varies, as shown typically in FIG. 4. A typical time derivative of the flux with respect to time in each stator core is shown in FIG. 5. Stated otherwise, the magnetic flux is not reversed, so that it varies only between a small positive value and a larger positive value, as reflected by points 22 and 23 on the graph of FIG. 6. This significantly reduces hysteresis and core losses and improves the efficiency of operation. The shape of the waveform representing the change in flux with respect to time may be varied by changing the size and shape of the alternating segments of high and low permeability.

Figure 8:
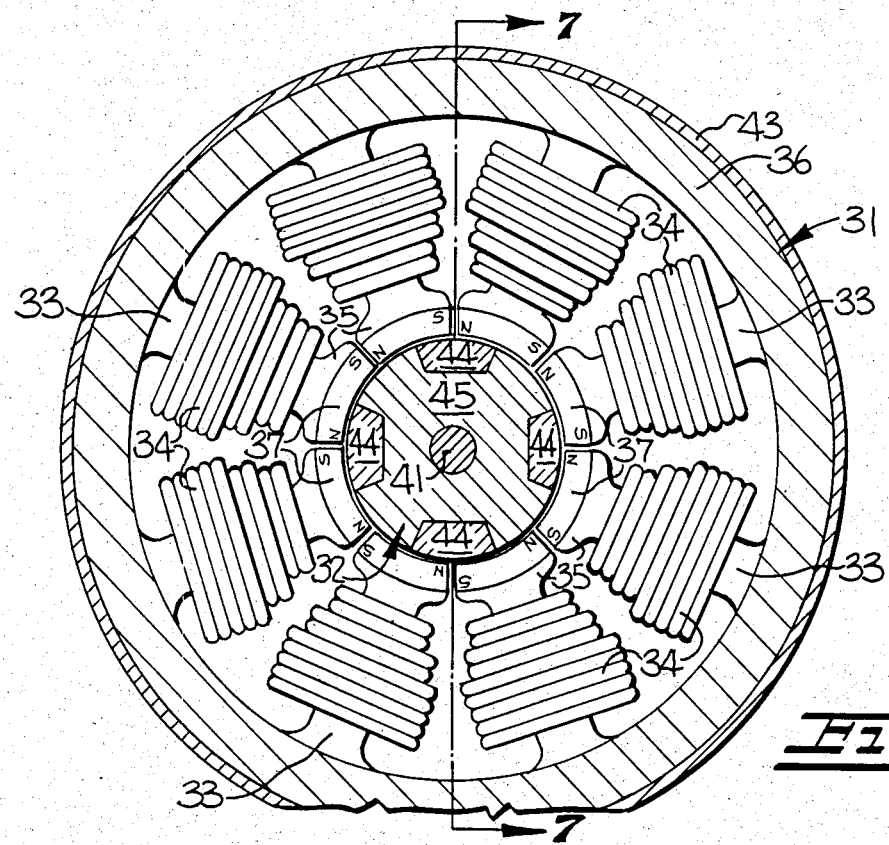
FIG. 8 is a cross sectional view of the generator of FIG. 7 taken along the line 8-8 of FIG. 7.

Referring now to FIGS. 7 and 8, the generator includes a stator portion 31 and a rotor portion 32. The stator portion comprises a series of axially displaced, coaxial, wagon wheel type configurations with stator windings 34 typically surrounding each of the radial spokes between a central stator portion 35 and the peripheral stator portion 36. Alternatively, the windings can be on the peripheral stator portions 36, or any combination of both. The axially displaced tiers of the stator are connected physically and magnetically by the peripheral stator portions 36 which may be, but are not necessarily, common to all of the stator arms 33 connecting the peripheral and central stator portions. Pluralities of pairs of axially spaced permanent magnets 37 are in magnetic circuit with the central stator portions 35 and peripheral stator portions 36. Like polarity poles of each pair are adjacent one another and define a cylinder 37S of like polarity poles, with the opposite polarity poles of the other magnet of each pair forming a second, axially spaced concentric cylinder 37N of like polarity poles. These two concentric cylinders 37S, 37N have a common axis 38 and form spaced opposite polarity poles that define a cylindrical gap 40 therebetween. The magnetic axis of each magnet is aligned along radii perpendicular to the axis of the rotor.

Referring to FIG. 8 and as noted earlier, the stator includes a cylindrical peripherial portion 36 having radially inwardly extending stator arms 33 in magnetic circuit therewith that terminate near the rotor portion 32. Adjacent the rotor, the cylinder 37N of permanent magnets in magnetic circuit with the stator portion is disposed with like polarity poles circumferentially adjacent one another.

The rotor illustrated in FIGS. 7 and 8 is typically, but not necessarily, cylindrical, being mounted on a shaft 41 journaled in bearings 42 that are fixed in casing 43. The rotor has longitudinally oriented peripherally spaced strips 44 of highly permeable magnetic material. The strips are embedded in a rotor of low permeability magnetic material 45, forming alternating bars of high and low magnetic permeability on the rotor surface. The stator and rotor together define a magnetic flux path G as shown in FIG. 7. As the rotor is turned around its axis 38, the segments of high and low magnetic permeability alternate through the cylindrical gap 40. The magnetic flux in the gap cyclically alternates between high values and low values as noted earlier, inducing a change in the magnetic flux in each of the stator arms 33. Thus, a voltage will be generated in the coils. Voltage control is accomplished as described for FIGS. 1 and 2 by coils surrounding the flux path G and/or by switches (not shown) for selectively interconnecting coils 34.

Referring to FIGS. 9 and 10, the variable reluctance generator illustrated therein includes the cylindrical gap as shown in FIGS. 7 and 8 together with a rotor having multiple axially displaced tiers, with adjacent tiers sharing magnetic paths. Referring to FIG. 9, the stator configuration is similar to that illustrated in FIGS. 7 and 8 with the stator windings 51 being wrapped around the peripheral portion 52 rather than the stator arms 53. Each of the axially displaced magnetic poles 54-57 is formed of segments of permanent magnets of like polarity poles, as illustrated at 54. The polarity of pole 55 is opposite that of pole 54, and the polarity of each axially succeeding pole alternates, as illustrated at succeeding poles 54(S), 55(N), 56(S), and 57(N), and as shown in FIGS. 7,8 and 9. Each pole has a substantially continuous cylindrical face. The succeeding gaps 58-61 are defined by adjacent, opposite polarity poles. The opposite polarity poles are connected by the magnetically permeable path of the stator arms 53 and peripheral portion 52.

Similar to the variation of FIGS. 1 and 2, one, two, or more magnets may be used in any magnetic flux path and they may be of any size, shape, material, or properties. Further, although disks and cylinders have been shown for the rotor configuration, any size or shape of rotor may be used. The size, shape, number and material of the flux path components may also vary.

Referring to FIGS. 9 and 10, the rotor R is comprised of five successive, axially displaced tiers 60-64 on a common rotor shaft 65 that is journaled in bearings 66 for rotation on the axis 67 of the stator. Each rotor tier is made of highly permeable magnetic material and has a bow tie, dog bone or propeller like cross sectional shape where portions of the material have been removed. Thus, since air has a low magnetic permeability, the rotation of the rotor R presents alternating surface segments having high and low magnetic permeability to complete the magnetic flux paths defined by the adjacent, but axially displaced, poles 54-57. Each rotor tier is rotationally displaced by the appropriate number of degrees from an adjacent tier to provide the desired poly-phase relationships between each of the flux paths of the generator. The highly permable rotor surface segments are shown cross hatched in the graph of FIG. 10. The material, dimensions and relative rotational positions of the rotor segments, as well as the number of segments, may be varied as necessary or desirable to provide the desired generator phase, voltage, current or waveform output.

In FIGS. 9 and 10 each pair of poles shares at least one pole with an adjacent pair of poles, and each of the tiers of the rotor shares a portion of its magnetic path with an adjacent tier so the material requirements in such a design may be reduced. However, the degree of sharing of magnetic paths between tiers and pole pairs may vary. Each tier and/or pole may in fact be completely independent.

Voltage control may be accomplished by the same means disclosed for FIGS. 1, 2, 7, and 8. While particular embodiments have been disclosed, it is understood that the invention is not limited thereto since modifications may be made by those skilled in the art, particularly in light of the foregoing teachings. It is, therefore, contemplated that the appended claims cover any such modifications that incorporate those features which constitute the essential features of the present invention.

That which is claimed is:

1. A variable magnetic reluctance generator comprising:

stator means having a pair of fixed spaced poles of opposite magnetic polarity, each pole forming a continuous and smooth surface ring without surface discontinuities, the two rings together defining an annular gap having a magnetic field between the poles with the field intensity being uniform along the length of the annular gap, and magnetically permeable means for providing a magnetically permeable path connecting the poles;

at least one fixed stator winding surrounding the magnetically permeable path means; and rotor means having alternating segments of high and low magnetic permeability, said rotor mean disposed for rotation with said segments of alternating high and low magnetic permeability remaining within and moving through the length of said gap between the opposite polarity poles, whereby the changes in the magnetic permeability of the gap between the opposite polarity poles resulting from the rotation of the rotor means causes variations in the magnitude but not direction of the magnetic flux in the associated magnetically permeable path means, which induces an electrical current in the surrounding stator winding.

2. The generator of claim 1 wherein the alternating segments of said rotor are disposed proximate the periphery of the rotor.

3. The generator of claim 1 wherein said pairs of magnetic poles of said stator define two planar rings of substantially equal diameter concentric with the axis of rotation of said rotor, said rings being generally parallel and axially spaced from each other to define a planar ring gap therebetween with the magnetic axes in the gap aligned parallel to the axis of rotation of said rotor.

4. The generator of claim 1 wherein said rotor means is disk shaped.

5. The generator of claim 1 wherein the surface portion of each of said poles defining said gap has substantially the same dimensions.

6. The generator of claim 1 wherein the surface portion of each of said segments of said rotor is substantially parallel to the surface portion of each of said poles.

7. The generator of claim 1 wherein the surface portion of each of said segments of said rotor has substantially the same dimension as the surface portion of each said poles.

8. The generator of claim 1 wherein said poles of said stator define two cylinders concentric with the axis of rotation of said rotor, said cylinders being axially spaced from one another to define a cylindrical gap therebetween with the magnetic axes aligned along radii from the axis of said rotor.

9. The generator of claim 1 wherein said rotor means is substantially cylindrically shaped and said alternating segments are longitudinally oriented along the rotor axis.

10. The generator of claim 1 wherein said rotor means is free of electrical windings.

11. The generator of claim 1 wherein said stator means further comprises multiple pairs of fixed spaced poles of opposite magnetic polarity defining multiple gaps for poly-phase current generation; and
    said rotor means further comprises multiple tiers of said alternating segments of high and low permeability each of said tiers being successively disposed along the rotor axis.

12. The generator of claim 11 wherein each pair of spaced magnetic poles of said stator shares at least a portion of its flux path with the flux path of another pair of spaced magnetic poles.

13. The generator of claim 11 wherein each tier of said alternating segments shares at least a portion of its high permeability segment with an adjacent tier.

14. The generator of claim 11 wherein each pair of spaced magnetic poles defines a cylinder concentric with the axis of rotation of said rotor, each cylinder being axially spaced from one another to define a cylindrical gap therebetween with the magnetic axes aligned along radii from the axis of said rotor.

15. The generator of claim 11 wherein said rotor means is substantially cylindrically shaped and said alternating segments are longitudinally oriented.

16. The generator of claim 1 further comprising means for controlling the voltage across the stator winding.

17. The generator of claim 16 wherein said means for controlling the voltage across the stator winding comprises at least one auxiliary field coil surrounding the magnetically permeable path means for controlling the flux flow therethrough.

18. The generator of claim 16 wherein said means for controlling the voltage across the stator winding comprising means for switching into or out of series circuit with the stator winding a predetermined number of turns of the armature coil.

19. A variable magnetic reluctance generator of electricity comprising:
    stator means having a pair of fixed spaced poles of opposite magnetic polarity, each pole forming a substantially continuous and planar ring without surface discontinuities, the two rings being of equal diameter and defining a central axis, said rings being generally parallel and axially spaced from each other to define a planar ring gap therebetween with the magnetic axis aligned parallel to said central axis and having opposite polarity poles on opposite sides thereof and a uniform magnetic field along the length thereof, and magnetically permeable path means for providing a magnetically permeable path connecting the poles;
    at least one fixed stator winding surrounding the magnetically permeable path means; and
    disk shaped rotor means having alternating segments of high and low magnetic permeability, said rotor means disposed for rotation about said central axis with said segments of alternating high and low magnetic permeability disposed on the periphery of said rotor means for movement within and through the length of said gap between the opposite polarity poles whereby the changes in the magnetic permeability of the gap between the opposite polarity poles resulting from the rotation of the rotor causes variations in the magnetic flux in the associated magnetically permeable path means, which induces an electrical current in the surrounding stator winding.

20. The generator of claim 19 wherein the surface portion of said poles defining said gap has substantially the same dimensions and the surface portion of the segments of said rotor has substantially the same dimensions as the surface portion of the poles.

21. The generator of claim 19 further comprising means for controlling the voltage across the stator winding.

22. The generator of claim 19 wherein said means for controlling the voltage across the stator winding comprises at least one auxiliary field coil surrounding the magnetically permeable path means for controlling the flux flow therethrough.

23. A variable magnetic reluctance generator of electricity comprising:
    stator means having one or more pairs of fixed spaced poles of opposite magnetic polarity, each pole forming a cylinder having a smooth continuous surface without surface discontinuities, the two cylindrical poles of each pair of poles being concentric and having a central axis defining a cylindrical gap therebetween with the magnetic axes aligned along radii from the central axis of said rotor and having a substantially uniform magnetic flux along the length thereof, and magnetically permeable path means providing a magnetically permeable path connecting the spaced poles of each pair of poles;
    at least one fixed stator winding surrounding a magnetically permeable path means; and
    cylindrically shaped rotor means having alternating segments of high and low magnetic permeability, said rotor means disposed for rotation about said central axis with said segments of alternating high and low magnetic permeability disposed on the periphery of said rotor means for movement within and through the length of said gap between the opposite polarity poles of each pair of magnetic poles, whereby the changes in the magnetic permeability of the gap between the opposite polarity poles of each pair resulting from the rotation of the rotor causes variations in the magnetic flux in the associated magnetically permeable path means, which induces an electrical current in the surrounding stator winding.

24. The generator of claim 23 wherein said alternating segments are longitudinally oriented.

25. The generator of claim 23 wherein said stator means further comprises multiple pluralities of pairs of spaced magnetic poles defining multiple gaps for poly-phase current generation, each pair of poles sharing at least one pole with an adjacent pair of poles; and said rotor means further comprises multiple tiers of said alternating segments of high and low permeability, each of said tiers being successively disposed along the rotor axis and sharing at least a portion of its high permeability segment with an adjacent tier.

26. The generator of claim 23 further comprising means for controlling the voltage across the stator winding.

27. The generator of claim 25 wherein said means for controlling the voltage across the stator winding comprises at least one auxiliary field coil surrounding the magnetically permeable path means for controlling the flux therethrough.

* * * * *